(12) United States Patent
Akiyama et al.

(10) Patent No.: US 7,229,211 B2
(45) Date of Patent: Jun. 12, 2007

(54) LINEAR GUIDE BEARING APPARATUS

(75) Inventors: Masaru Akiyama, Kanagawa (JP); Toshiaki Yamaguchi, Kanagawa (JP)

(73) Assignee: NSK, Ltd., Tokyo (JP)

( * ) Notice: Subject to any disclaimer, the term of this patent is extended or adjusted under 35 U.S.C. 154(b) by 83 days.

(21) Appl. No.: 11/154,697

(22) Filed: Jun. 17, 2005

(65) Prior Publication Data

US 2005/0281497 A1    Dec. 22, 2005

(30) Foreign Application Priority Data

Jun. 17, 2004    (JP) .......................... P.2004-179791

(51) Int. Cl.
*F16C 29/06* (2006.01)

(52) U.S. Cl. ...................................... 384/44

(58) Field of Classification Search ............. 384/43–45
See application file for complete search history.

(56) References Cited

U.S. PATENT DOCUMENTS 5,161,896 A * 11/1992 Hofling et al. ................ 384/44
5,308,164 A * 5/1994 Tanaka ......................... 384/44
7,044,641 B2 * 5/2006 Scotte et al. .................. 384/44

FOREIGN PATENT DOCUMENTS

DE          296 23 942 U1    11/2000
JP          4-366016 A       12/1992
WO          WO 2005/068860 A1  7/2005

* cited by examiner

*Primary Examiner*—Thomas R. Hannon
(74) *Attorney, Agent, or Firm*—Sughrue Mion, PLLC

(57) ABSTRACT

A linear guide bearing apparatus 1 includes a guide rail 2 and a slider 4 riding over the guide rail 2 movably relative thereto, the slider 4 includes a slider main body 8 and end caps 10 respectively joined to both end faces in an axial direction of the slider main body 8, and the end cap 10 includes an end cap main body 44 formed with a middle guide face 54 and an outer peripheral guide face 56 of an inner side direction change path 50 as well as an inner peripheral guide face 62 and a middle guide face 64 of an outer side direction change path 60, a return guide 46 formed with an inner peripheral guide face 52 of the inner side direction change path 50, and a lid member 48 formed with an outer peripheral guide face 66 of the outer side direction change path 60.

2 Claims, 9 Drawing Sheets

LINEAR GUIDE BEARING APPARATUS

BACKGROUND OF THE INVENTION

The present application claims foreign priority under 35 USC 119 based on Japanese application no. 2004-179791, filed on Jun. 17, 2004, the contents of which is incorporated herein by reference. This priority claim is being made concurrently with the filing of this application.

The present invention relates to a linear guide bearing apparatus used in a machine tool, a semiconductor fabricating apparatus or the like of a machine element part for guiding a linearly moving body.

There is a generally used linear guide bearing apparatus described in, for example, Patent Reference 1. As shown by FIG. 14, the linear guide bearing apparatus 1 is provided with a guide rail 2, and a slider 4 riding over the guide rail 2 movably relative to each other.

Each of both slider faces of the guide rail 2 is formed with two rows of rolling member rolling grooves 6 extended in an axial direction.

The slider 4 comprises a slider main body 8 and end caps 10 respectively joined to both end faces in the axial direction of the slider main body 8. As shown by FIG. 15, inner side faces of both sleeve portions of the slider main body 8 are respectively formed with rolling member rolling grooves 16 opposed to the rolling member rolling grooves 6 of the guide rail 2, and a load rolling path 14 is constituted from an interval between the two rolling member rolling grooves 6, 16. Further, thick wall portions of the both sleeve portions are respectively formed with two rows of rolling member return paths 24.

The load rolling path is rollably charged with a plurality of cylindrical rollers 18 as rolling members, and the slider 4 is made to be movable along the axial direction on the guide rail 2 relative to each other by way of rolling of the cylindrical rollers 18.

When the slider 4 is moved, the plurality of cylindrical rollers 18 charged to the load rolling path 14 are moved to an end portion in the axial direction of the slider 4 while being rolled. Therefore, in order to continuously move the slider 4 in the axial direction, it is necessary to infinitely circulate the plurality of cylindrical rollers 18.

Therefore, by forming a direction change path communicating between the load rolling path 14 and the rolling member return path 24, there is formed a rolling member rolling path for infinitely circulating the plurality of cylindrical rollers 18.

As shown by FIG. 16, the end cap 10 is constituted by an end cap main body 44 and a fit-to-insert member 90. Further, by providing an opening portion at a face of the end cap main body 44 for joining with the slider main body 8 and fitting the fit-to-insert member 90 to the opening portion, an inner side direction change path 50 and an outer side direction change path 60 are formed.

As shown by FIG. 17, the inner side direction change path 50 is constituted by an inner peripheral guide face 52 and an outer peripheral guide face 56 opposed to a rolling face of the cylindrical roller 18, and a middle guide face 54 opposed to an end face of the cylindrical roller 18. Also the outer side direction change path 60 is similarly constituted by an inner peripheral guide face 62 and an outer peripheral guide face 66 opposed to the rolling face of the cylindrical roller 18, and a middle guide face 64 opposed to the end face of the cylindrical roller 18. The inner side direction change path 50 and the outer side direction change path 60 are intersected by each other in a crossing shape, and communicate between the load rolling paths 14 and the rolling member return paths 24 different from each other.

[Patent Reference 1]
JP-A-Hei4-366016

However, according to the linear guide bearing apparatus 1 having the above-described constitution, a connecting portion 92 for connecting the end cap main body 44 and the fit-to-insert member 90 is formed at the middle guide face 54 and the outer peripheral guide face 56 of the inner side direction change path 50. Further, when a stepped difference is produced at the connecting portion 92 by an error in molding the end cap main body 44 and the fit-to-insert member 90 or the like, smooth circulation of the cylindrical roller 18 is hampered and therefore, operability of the linear guide bearing apparatus 1 is deteriorated. Particularly, when the stepped difference is produced at the connecting portion 92 formed at the middle guide face 54, a problem of catching the end face of the cylindrical roller 18 by the stepped difference or the like is posed and therefore, the operability of the linear guide bearing apparatus 1 is further deteriorated.

Such a problem can be prevented by molding the end cap main body 44 and the fit-to-insert member 90 with high accuracy or promoting accuracy of attaching the fit-to-insert member 90 to the end cap main body 44. However, the end cap main body 44 and the fit-to-insert member 90 are fabricated by injection molding and therefore, deformation is frequently brought about by a sink mark in molding or the like and it is difficult to mold the end cap main body 44 and the fit-to-insert member 90 with high accuracy. Further, there is a limit also in promoting the accuracy for attaching the fit-to-insert member 90 to the end cap main body 44 and it is difficult to firmly prevent the stepped difference from being produced to the connecting portion 92.

SUMMARY OF THE INVENTION

The invention is carried out by paying attention to the above-described problem and it is a problem thereof to provide a linear guide bearing apparatus capable of smoothly circulating a rolling member by constituting structures of members constituting an end cap by structures in which a portion of connecting the members constituting the end cap is not formed at middle guide faces of an inner side direction change path and an outer side direction change path.

In order to resolve the above-described problem, according to the invention, the invention described in claim 1 is characterized in a linear guide bearing apparatus including: a guide rail having a plurality of rows of rolling member rolling grooves extended in an axial direction at both side faces thereof, a slider main body having rolling member rolling grooves opposed to the rolling member rolling grooves of the guide rail, riding over the guide rail movably relative thereto and having a plurality of rows of rolling member return paths, end caps respectively joined to both end faces in the axial direction of the slider main body, and formed with a plurality of rows of direction change paths for communicating intervals between load rolling paths formed with intervals between the both rolling member rolling grooves and the rolling member return paths, rolling members including a plurality of rollers rollably charged into rolling member rolling paths formed with the load rolling path, the rolling member return paths and the direction change paths, wherein the plurality of rows of direction change paths are formed with inner peripheral guide faces, outer peripheral guide faces respectively opposed to rolling faces of the rollers and middle guide faces opposed to end faces of the rollers, a set of two rows of direction change paths in the plurality of rows of direction change paths are formed with an inner side direction change path and an outer side direction change path, the respective direction change paths communicate intervals between the load rolling paths and the rolling member return paths different from each other, and the end cap includes; an end cap main body formed with a middle guide face and an outer peripheral guide face of the inner side direction change path, and an inner peripheral guide face and a middle guide face of the outer side direction change path, a return guide formed with an inner peripheral guide face of the inner side direction change path, and a lid member formed with an outer peripheral guide face of the outer side direction change path.

Further, according to the invention, the invention described in claim 2 is characterized in the linear guide bearing apparatus according to claim 1, wherein the set of two rows of direction change path in the plurality of rows of direction change paths are formed with an inner side direction change path and an outer side direction change path intersected with each other in a crossing shape.

According to the invention, the middle guide face of the inner side direction change path is not formed with a connecting portion for connecting the end cap main body and the return guide, further, the middle guide face of the outer side direction change path is not formed with a connecting portion for connecting the end cap main body and the lid member and therefore, a stepped difference is prevented from being brought about at the middle guide faces of the inner side direction change path and the outer side direction change path.

According to the invention, connecting portions for connecting members constituting the end cap are not formed at the middle guide faces of the inner side direction change path and the outer side direction change path and therefore, operability of the linear guide bearing apparatus can be promoted by enabling to circulate the rolling member smoothly.

DETAILED DESCRIPTION OF THE PREFERRED EMBODIMENTS

Next, an embodiment of the invention will be explained in reference to the drawings. Further, an explanation will be given by attaching the same notations to constitutions similar to those of the background art. Further, although according to the embodiment, an explanation will be given by taking an example of a linear guide bearing apparatus using a cylindrical roller as a rolling member and formed with rolling member rolling paths by two rows on the left and on the right, the embodiment is not limited thereto.

First, a constitution of the embodiment of the invention will be explained in reference to FIG. 1 through FIG. 12. Further, in respective drawings of FIG. 4 and thereafter, a cylindrical roller is omitted for explanation.

Figure 1:
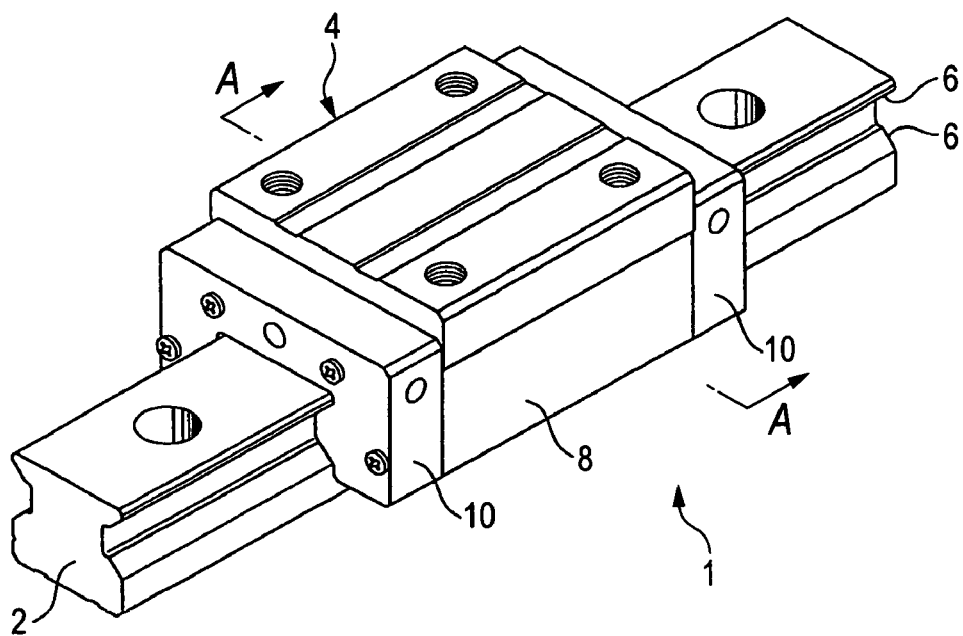
FIG. 1 is a perspective view showing a linear guide bearing apparatus according to an embodiment based on the invention.

As shown by FIG. 1, the linear guide bearing apparatus 1 of the invention is constituted by the guide rail 2, and the slider 4 riding over the guide rail 2 movably relative to each other. Each of the both side faces of the guide rail 2 is formed with two rows of the rolling member rolling grooves 6 extended along the axial direction.

The slider 4 is constituted from the slider main body 8, and the end caps 10 respectively joined to the both end faces in the axial direction of the slider main body 8.

Figure 2:
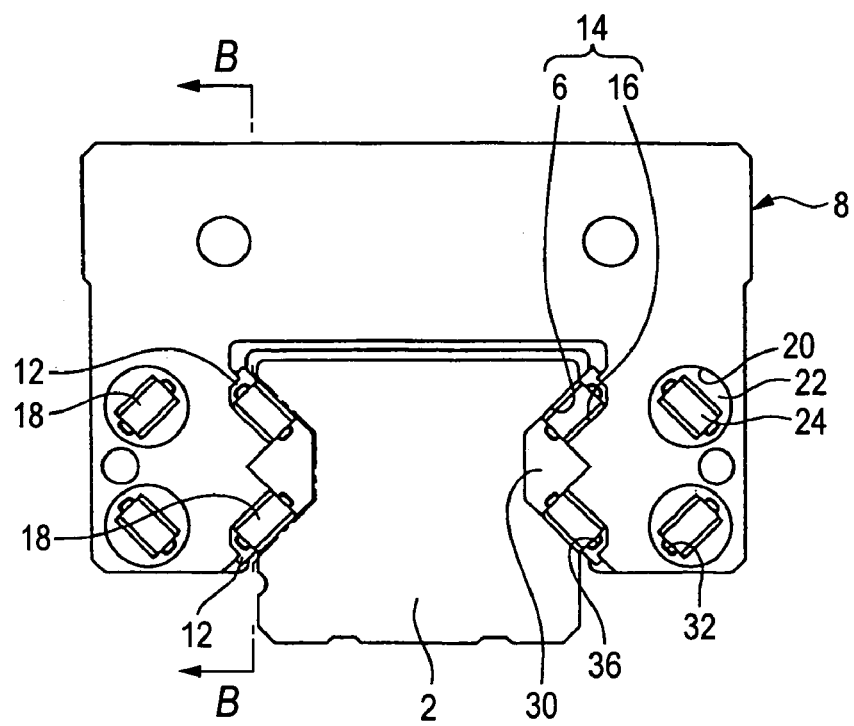
FIG. 2 is a sectional view taken along a line A—A of FIG. 1.

As shown by FIG. 2, the slider main body 8 is formed with rolling member rolling grooves 16 opposed to rolling member rolling grooves 16 of the guide rail 2 respectively on inner side faces of both sleeve portions, and formed with load moving paths 14 at intervals between the two rolling member rolling grooves 6, 16. The load rolling path 14 is rollably charged with a plurality of cylindrical rollers 18 as rolling members and the slider 4 is made to be movable on the guide rail 2 along the axial direction relative to each other by way of rolling of the cylindrical rollers 18. Further, positioning reference faces 12 of the end cap 10 are formed upward from the rolling member rolling groove 16 on an upper side and downward from the rolling member rolling groove 16 on a lower side.

At thick wall portions of the both sleeve portions, holes 20 in parallel with the load rolling path 14 are bored respectively at two upper and lower portions thereof, and tubes 22 formed by a resin or the like are inserted into the holes 20. Inside of the tube 22 is formed with a hole having a section in a rectangular shape through which the cylindrical roller 18 can pass, and by the hole having the section in the rectangular shape, the rolling member return path 24 is formed. Further, inside of the tube 22 is formed with a recess portion 32 and at inside of the recess portion 32, an arm portion 28 of a hold piece 26, mentioned later, is made to be movable. Further, although in the drawing, for explanation, the cylindrical roller 18 is not charged to the load rolling path 14 and the rolling member return path 24 on the right side, in actual use, the cylindrical roller 18 is charged to all of the load rolling paths 14 and the rolling member return paths 24.

Figure 3:
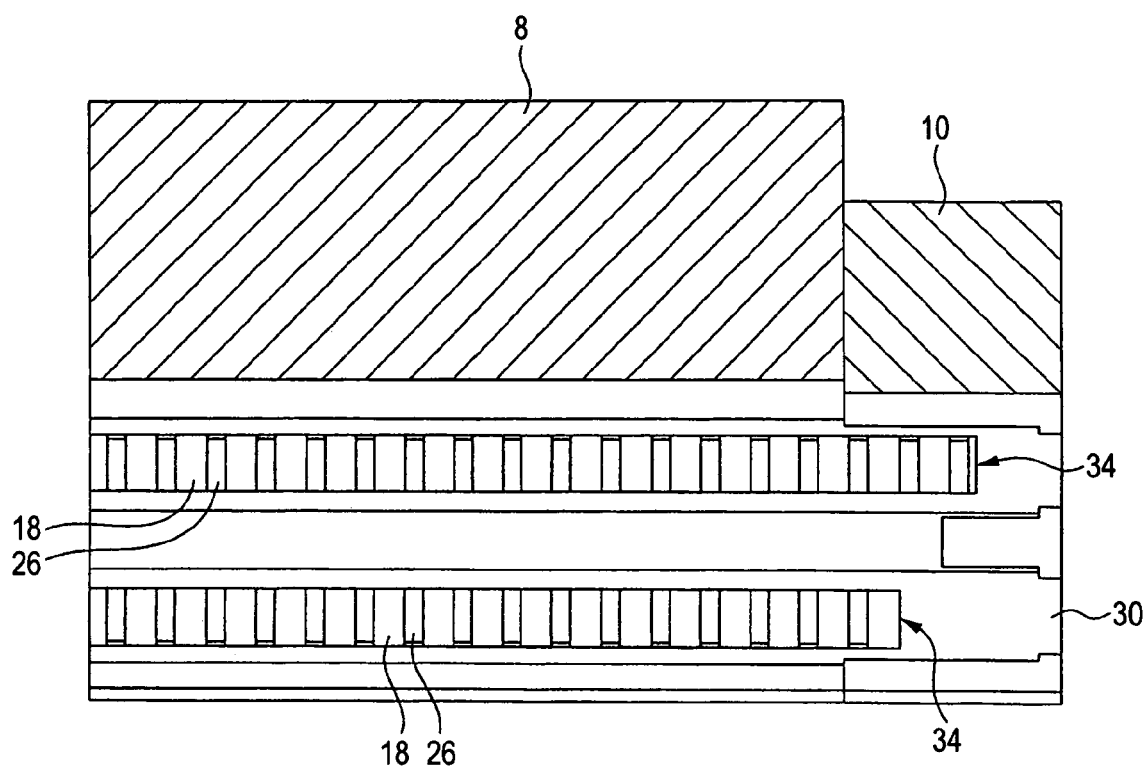
FIG. 3 is a sectional view taken along a line B—B of FIG. 2.
Figure 4A:
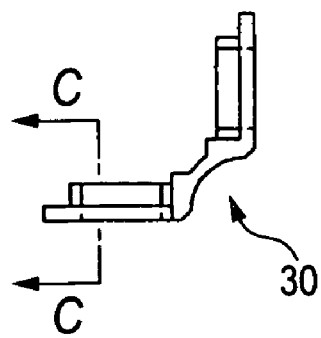
FIG. 4A is a view viewing a holder from an axial direction.
Figure 4B:
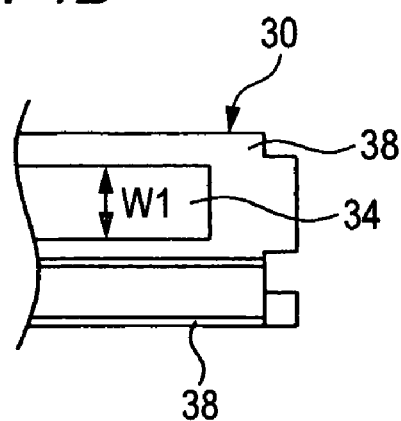
FIG. 4B is a view viewed from a left side of FIG. 4A.
Figure 4C:
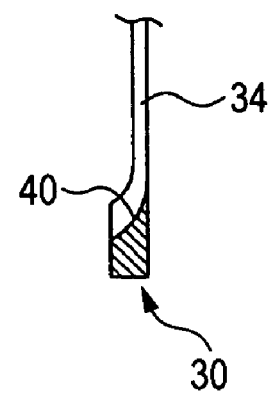
FIG. 4C is a portion of a sectional view taken along a line C—C of FIG. 4A.

A holder 30 is arranged between the guide rail 12 and the slider main body 8, and a recess portion 36 is formed between the slider main body 8 and the holder 30. As shown by FIG. 3 and FIG. 4, the holder 30 is a plate-like member having a section substantially in an L-like shape, and window portions 34 are formed at respective faces thereof constituting substantially right angle along a longitudinal direction of the holder 30. A width W1 of the window portion 34 orthogonal to the longitudinal direction of the holder 30 is formed to be larger than an actual length of the cylindrical roller 18. Both end portions in the longitudinal direction of the holder 30 are provided with projected portions 38 and scoop up portions 40. Further, at inside of the recess portion 36, the arm portion 28 of the hold piece 26, mentioned later, is made to be movable.

Figure 5:
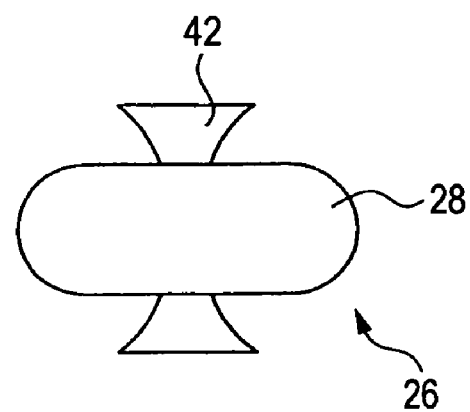
FIG. 5 is a view viewing a hold piece from an end face thereof.
Figure 6:
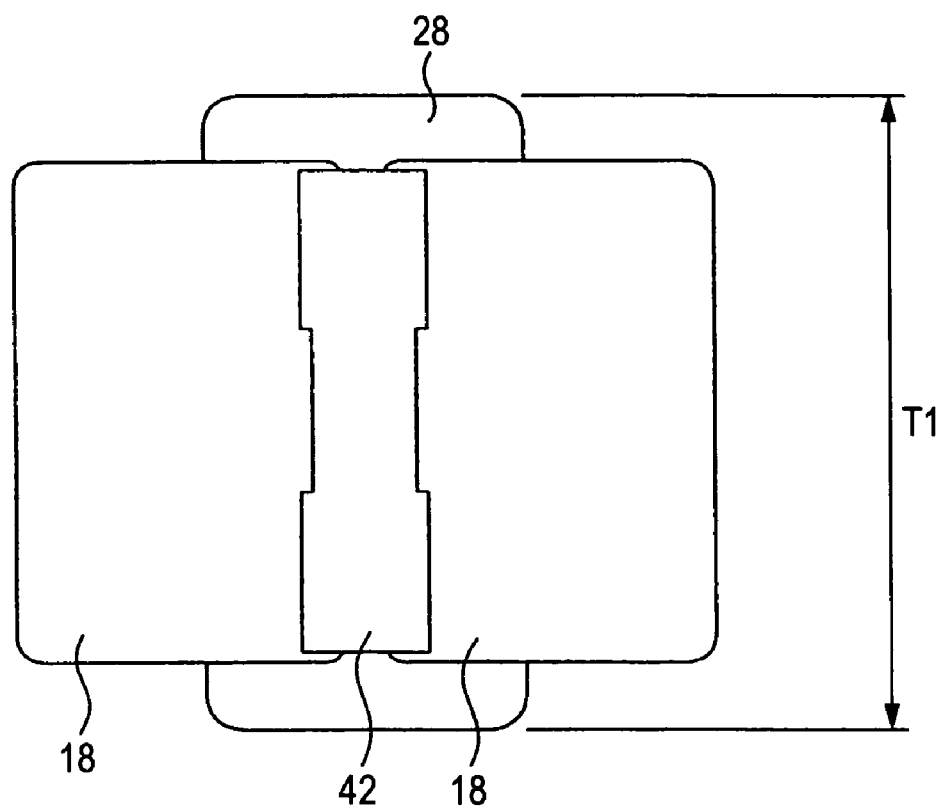
FIG. 6 is a view representing a state of interposing the hold piece between cylindrical rollers contiguous to each other.

The hold pieces 26 are interposed among the plurality of cylindrical rollers 18. As shown by FIG. 5 and FIG. 6, the hold piece 26 comprises a spacer portion 42 brought into sliding contact with the rolling faces of the cylindrical rollers 18 contiguous to each other and the arm portion 28 respectively provided on upper and lower sides of the spacer portion 42 for holding end faces of the cylindrical roller 18 contiguous to each other from upper and lower sides. A height T1 in an up and down direction of the hold piece 26 is formed to be larger than the width W1 of the window portion 34.

The end cap 10 is formed with inner side direction change paths and outer side direction change paths, and the inner side direction change paths and the outer side direction change paths respectively communicate intervals between the load rolling paths 14 and the rolling member return paths 24 different from each other.

Both of the inner side direction rolling path and the outer side direction rolling path are constituted by inner peripheral guide faces and the outer peripheral guide faces opposed to the rolling face of the cylindrical roller 18 and middle guide faces opposed to end faces of the cylindrical roller 18.

Further, a rolling member rolling path is formed by the inner side direction change path and the outer side direction change path, and the load rolling path 14 and the rolling member return path 24, mentioned above, and in accordance with relative movement of the slider 4, the cylindrical roller 18 is infinitely circulated while being rolled in the rolling member rolling path.

As shown by FIG. 7 through FIG. 12, the end cap 10 is constituted by the end cap main body 44 and a return guide 46 and a lid member 48 attached to the end cap main body 44.

Figure 7:
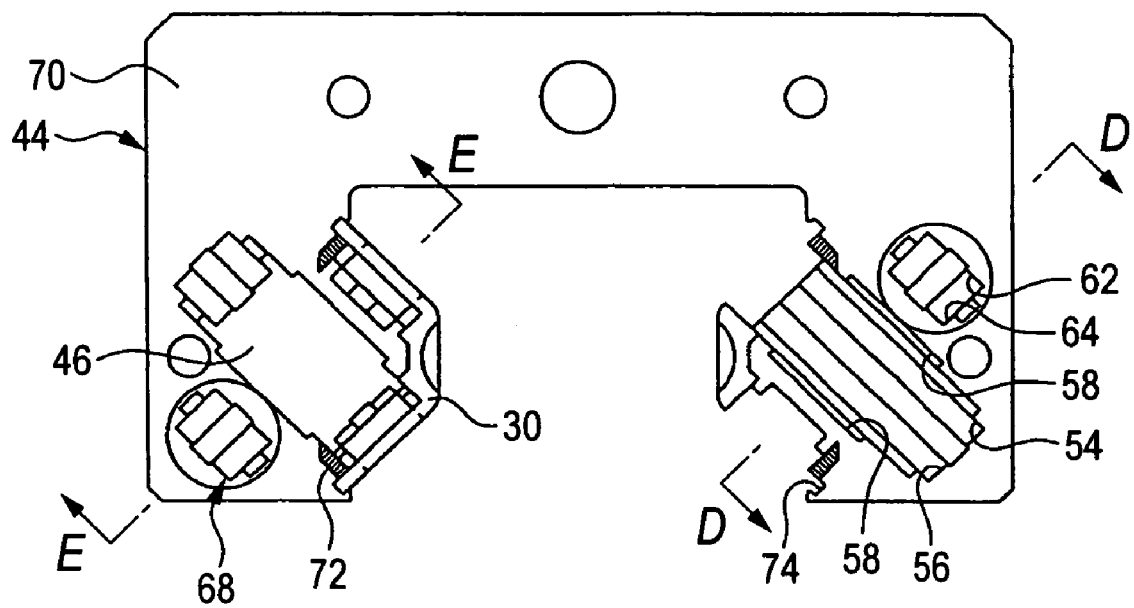
FIG. 7 is a front view of a face of an end cap joined with a slider main body.

As shown by FIG. 7, a side of a joining face 70 joined with the slider main body 8 of the end cap main body 44 is provided with a middle guide face 54 and an outer peripheral guide face 56 of the inner side direction change path, an end portion 68 of the outer side direction change path, a positioning projection 72 and a recess portion 74. Further, although in the drawing, for explanation, the return guide 46 and the holder 30 are attached only to the left side of the end cap main body 44, in actual use, the return guides 46 and the holders 30 are attached to both left and right sides of the end cap main body 44. The outer side peripheral guide face 56 of the inner side direction change path is provided with the positioning recess portions 58 at both side faces thereof, and the positioning recess portion 58 is made to be continuous to the middle guide face 54 of the inner side direction change path. Inside of the end portion 68 of the outer side direction change path is formed with an inner side guide face 62 and a middle guide face 64 of the outer side direction change path. The recess portion 74 is constituted by a shape of being fitted to the projected portion 38 of the holder 30.

Figure 8:
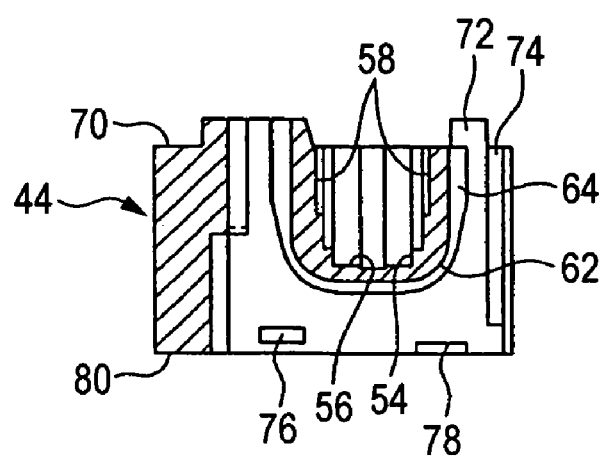
FIG. 8 is a sectional view taken along a line D—D of FIG. 7.

As shown by FIG. 8, the positioning projection 72 is constituted by a shape projected from the joining face 70 of the end cap main body 44 and fitted to the positioning reference face 12 of the slider main body 8. Further, a locking recess portion 76 and a positioning recess portion 78 are provided between the outer peripheral guide face 56 of the inner side direction change path and an outer side face 80 of the end cap main body 44.

Figure 9A:
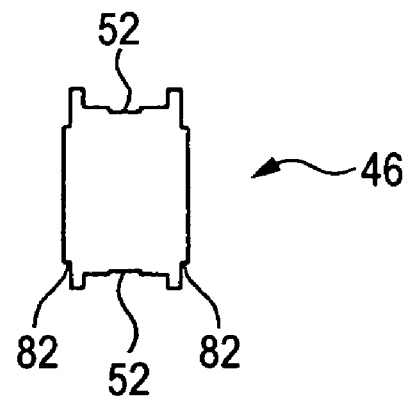
FIG. 9A is a top view of a return guide.
Figure 9B:
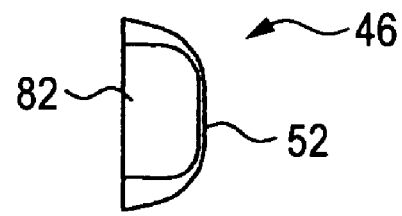
FIG. 9B is a view viewed from a right side of FIG. 9A.
Figure 9C:
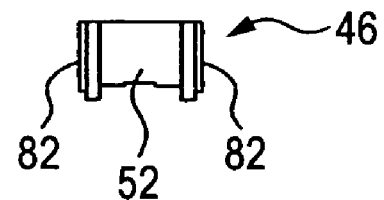
FIG. 9C is a view viewed fro a lower side of FIG. 9A.

As shown by FIG. 9, the return guide 46 is formed with the inner peripheral guide face 52 of the inner side direction change path. Both side faces of the return guide 46 are respectively provided with positioning projected portions 82 and the positioning projected portion 82 is constituted by a shape fitted to the positioning recess portion 58 of the end cap main body 44.

Figure 10:
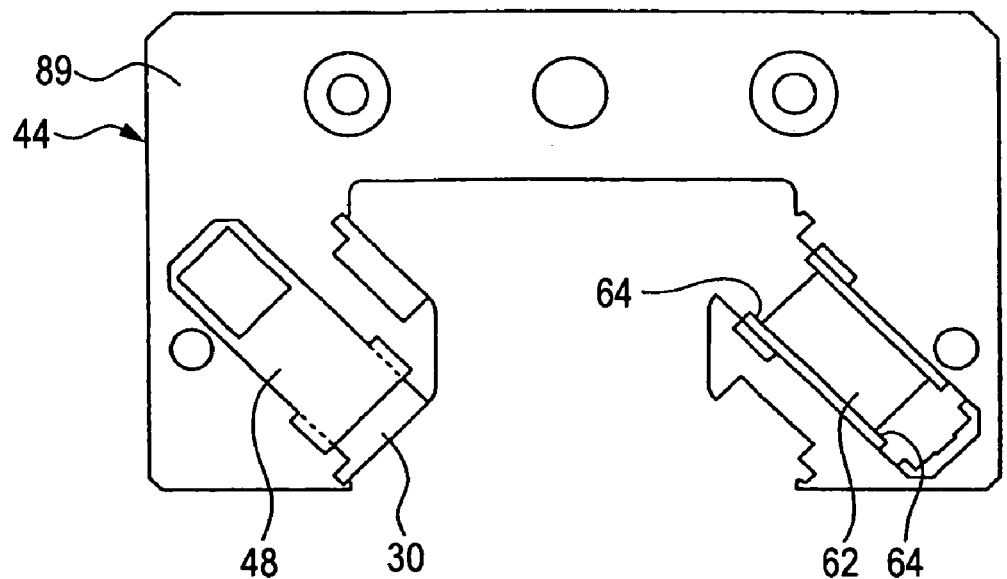
FIG. 10 is a front view of an outer side face of an end cap.

As shown by FIG. 10, a side of the outer side face 89 of the end cap main body 44 is formed with the inner peripheral guide face 62 and the middle guide face 64 of the outer side direction change path. Further, although in the drawing, for explanation, the lid member 48 and the holder 30 are attached only to the left side of the end cap main body 44, in actual use, the lid members 48 and the holders 30 are attached to both left and right sides of the end cap main body 44. The inner peripheral guide face 62 and the middle guide face 64 of the outer side direction change path are made to be continuous to the joining face 70 of the slider main body 8.

Figure 11A:
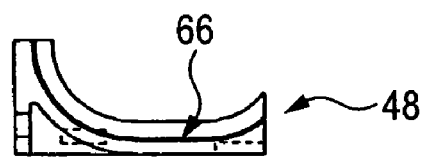
FIG. 11A is a side view of a lid member.
Figure 11B:
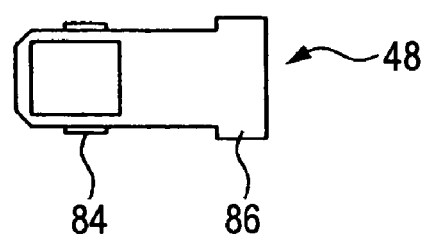
FIG. 11B is a view viewed from a lower side of FIG. 11A.

As shown by FIG. 11, the lid member 48 is formed with the outer peripheral guide face 66 of the outer side direction change path. Both side faces of the lid member 48 are respectively formed with locking projected portions 84 and positioning projected portions 86. The locking projected portion 84 is constituted by a shape of being fitted to the locking recess portion 76 of the end cap main body 44 and the positioning projected portion 86 is constituted by a shape of being fitted to the positioning recess portion 78 of the end cap main body 44.

An explanation will be given of integration of the end cap 10 as follows.

The end cap 10 is integrated by attaching the return guide 46 and the lid member 48 to the end cap main body 44. When the return guide 46 is attached to the end cap main body 44, the positioning projected portion 82 of the return guide 46 is fitted to the positioning recess portion 58 of the end cap main body 44. When the lid member 48 is attached to the end cap main body 44, first, the locking projected portion 84 of the lid member 48 is fitted to the locking recess portion 76 of the end cap main body 44. Further, the positioning projected portion 86 of the lid member 48 is fitted to the positioning recess portion 78 of the end cap main body 44. In this way, by attaching the return guide 46 and the lid member 48 to the end cap main body 44, the return guide 46 and the lid member 48 are attached to the end cap main body 44 in a pertinent state.

Figure 12:
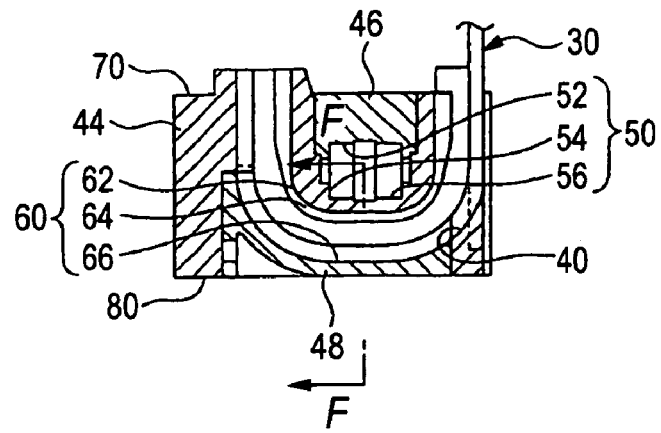
FIG. 12 is a sectional view taken along a line E—E of FIG. 7.

When the return guide 46 and the lid member 48 are attached to the end cap main body 44, as shown by FIG. 12, the end cap 10 is formed with the inner side direction change path 50 and the outer side direction change path 60. The inner side direction change path 50 and the outer side direction change path 60 are intersected with each other in a crossing shape.

Next, an explanation will be given of operation, effect and the like of the linear guide bearing apparatus 1 having the above-described constitution.

When the slider 4 is moved along the guide rail 2 relative thereto, the cylindrical roller 18 rolling in the load rolling path 14 is moved to the inner side direction change path 50 and the outer side direction change path 60 formed at the end cap 10.

The cylindrical roller 18 moved to the inner side direction change path 50 passes through the inner side direction change path 50 and is moved to the rolling member return path 24. When the cylindrical roller 18 passes through the inner side direction change path 50, the end face of the cylindrical roller 18 is guided by the middle guide face 54 of the inner side direction change path 50. Further, the cylindrical roller 18 moved to the outer side direction change path 60 passes through the outer side direction change path 60 and is moved to the rolling member return path 24. When the cylindrical roller 18 passes through the outer side direction change path 60, the end face of the cylindrical roller 18 is guided by the middle guide face 64 of the outer side direction change path 60.

In this case, the middle guide face 54 of the inner side direction change path 40 is formed only by the end cap main body 44 and the middle guide face 54 is not formed with a portion of connecting the end cap main body 44 and the return guide 46. Further, also the middle guide face 64 of the outer side direction change path 60 is formed only by the end cap main body 44 and the middle guide face 64 is not formed with a portion of connecting the end cap main body 44 and the lid member 48. Therefore, a stepped portion is not produced at the middle guide face 54 and the middle guide face 64, the cylindrical roller 18 is smoothly circulated at the inner side direction change path 50 and the outer side direction change path 60 and therefore, operability of the linear guide bearing apparatus 1 is promoted.

Further, although according to the embodiment, an explanation has been given of the linear guide bearing apparatus 1 having the constitution of using the holder 30 and the hold piece 26, the embodiment is applicable also to the linear guide bearing apparatus 1 having a constitution in which at least one of the holder 30 and the hold piece 26 is not used.

Figure 13:
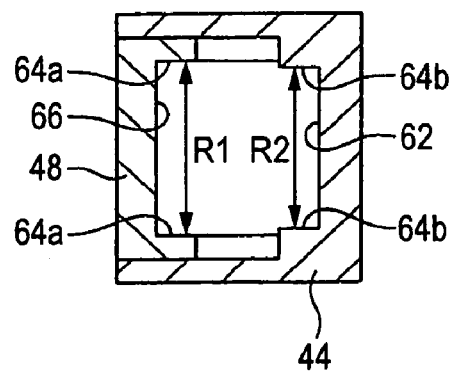
FIG. 13 is a sectional view taken along a line F—F of FIG. 12.
Figure 14:
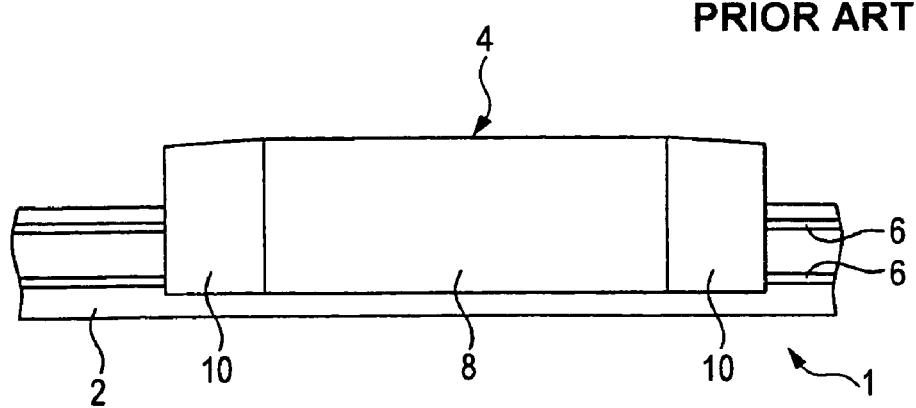
FIG. 14 is a side view showing a linear guide bearing apparatus of a background art.
Figure 15:
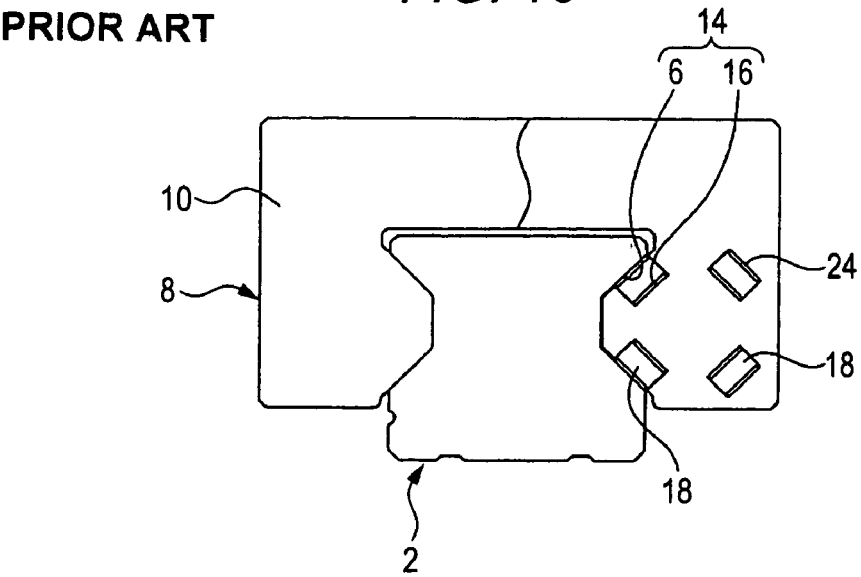
FIG. 15 is a partially broken view of an end cap viewed from a left side of FIG. 14.
Figure 16:
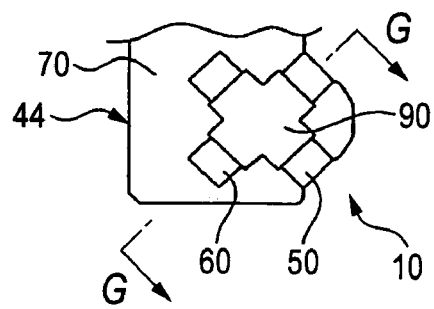
FIG. 16 is a view viewing a portion of the end cap of the background art from a side of a slider main body.
Figure 17:
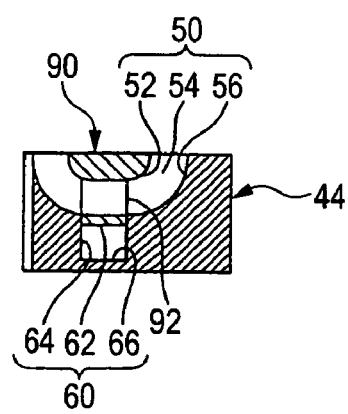
FIG. 17 is a sectional view taken along a line G—G of FIG. 16.

Further, as shown by FIG. 13, the lid member 48 may be formed such that an interval R1 between middle guide faces 64*a* formed at the lid member 48 becomes wider than an interval R2 between middle guide faces 64*b* formed at the end cap main body 44. At this occasion, the interval R2 between the middle guide faces 64*b* is made to be equal to or larger than an actual length of the cylindrical roller 18. When the lid member 48 is constituted in this way, the middle guide face 64*a* does not contribute to the embodiment as a guide face of the end face of the cylindrical roller 18, and only the middle guide face 64*b* contributes thereto as a guide face of the end face of the cylindrical roller 18. Therefore, the end face of the cylindrical roller 18 moving in the outer side direction change path 60 is not caught by the portion of connecting the end cap main body 44 and the lid member 38, and is not caught by the portion of connecting the lid member 48 and the holder 30 and therefore, operability of the linear guide bearing apparatus 1 is promoted by smoothly circulating the cylindrical roller 18. Further, in the drawing, the cylindrical roller 18 is omitted for explanation.

What is claimed is:

1. A linear guide bearing apparatus comprising:
a guide rail having a plurality of rows of rolling member rolling grooves extended in an axial direction at both side faces thereof,
a slider main body having rolling member rolling grooves opposed to the rolling member rolling grooves of the guide rail, riding over the guide rail movably relative thereto and having a plurality of rows of rolling member return paths,
end caps respectively joined to both end faces in the axial direction of the slider main body, and formed with a plurality of rows of direction change paths for communicating intervals between load rolling paths formed with intervals between the both rolling member rolling grooves and the rolling member return paths,
rolling members including a plurality of rollers rollably charged into rolling member rolling paths formed with the load rolling path, the rolling member return paths and the direction change paths, wherein
the plurality of rows of direction change paths are formed with inner peripheral guide faces, outer peripheral guide faces respectively opposed to rolling faces of the rollers and middle guide faces opposed to end faces of the rollers,
a set of two rows of direction change path in the plurality of rows of direction change paths are formed with an inner side direction change path and an outer side direction change path,
the respective direction change paths communicate the load rolling paths with the rolling member return paths different from each other, and
the end cap includes;
an end cap main body formed with a middle guide face and an outer peripheral guide face of the inner side direction change path, and an inner peripheral guide face and a middle guide face of the outer side direction change path,
a return guide formed with an inner peripheral guide face of the inner side direction change path, and
a lid member formed with an outer peripheral guide face of the outer side direction change path.

2. The linear guide bearing apparatus according to the claim 1, wherein
the set of two rows of direction change path in the plurality of rows of direction change paths are formed with an inner side direction change path and an outer side direction change path intersected with each other in a crossing shape.

* * * * *